O. B. DAY.
MOVING PICTURE OPERATOR'S AUTOMATIC SIGNALING DEVICE.
APPLICATION FILED OCT. 18, 1916.
1,223,771.
Patented Apr. 24, 1917.
2 SHEETS—SHEET 2.
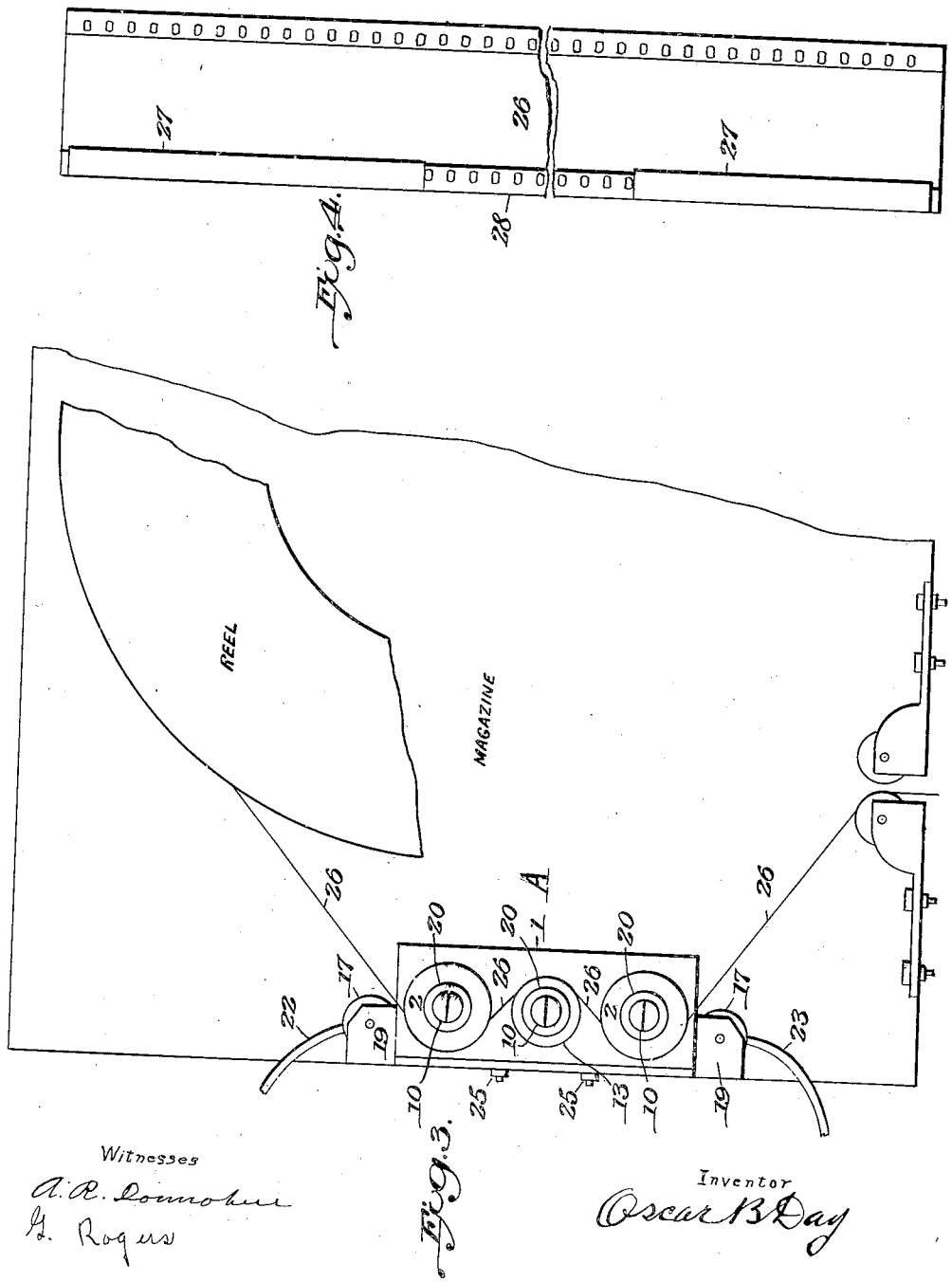

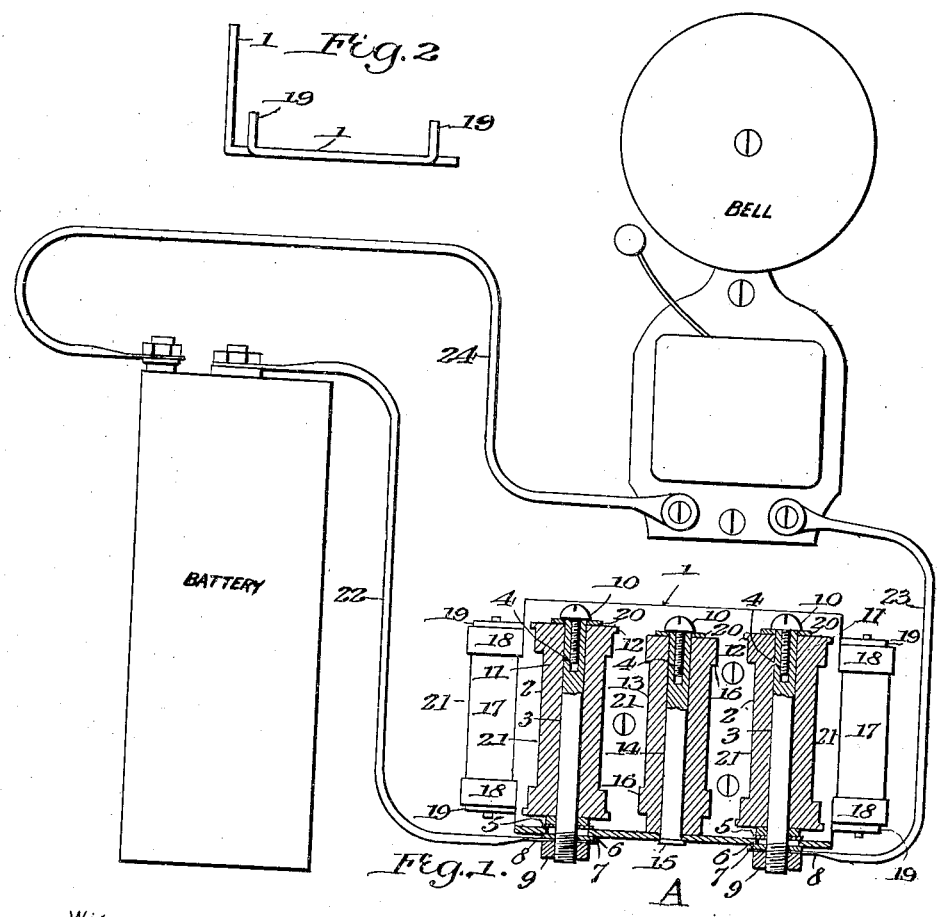

UNITED STATES PATENT OFFICE.

OSCAR B. DAY, OF GREENCASTLE, INDIANA.

MOVING-PICTURE-OPERATOR'S AUTOMATIC SIGNALING DEVICE.

1,223,771.   Specification of Letters Patent.   Patented Apr. 24, 1917.

Application filed October 18, 1916. Serial No. 126,378.

*To all whom it may concern:*

Be it known that I, OSCAR B. DAY, a citizen of the United States, residing at Greencastle, in the county of Putnam and State of Indiana, have invented a new and useful Moving-Picture-Operator's Automatic Signaling Device, of which the following is a specification.

The present invention appertains to improvements in moving picture operator's automatic signaling devices.

An object of the invention is to provide a moving picture operator's automatic signaling device so shaped or designed as to admit of its easy attachment within the magazine.

Another object of the invention is to provide a moving picture operator's automatic signaling device that obviates the necessity of punching holes through, or otherwise mutilating the film as at present done, as a warning to the operator to change machines.

Still another object of the invention is to provide a moving picture operator's automatic signaling device that is simple in construction and dependable in operation, and the expense of which is not an obstacle to its use.

With the above and other objects in view, that will appear as the description proceeds, the invention resides in the combination and arrangement of parts and in the details of construction described and claimed, it being understood that changes in the precise embodiment of the invention can be made within the scope of what is claimed without departing from its spirit as hereinafter described, claimed and illustrated in the accompanying drawings in which:—

Figure 1 is a plan view of the moving picture operator's automatic signaling device, the rollers cut through the center longitudinally showing the various parts as hereinafter described, and also showing the connection with the battery and signal bell.

Fig. 2 is a sectional view of the moving picture operator's automatic signaling device showing a cross section of the frame 1.

Fig. 3 is a perspective side view of the moving picture operator's automatic signaling device, showing the device, the film, a portion of a magazine, a portion of a reel and also showing the film passing between the rollers and through the slot at the bottom of the magazine, the magazine, reel, rollers and slot being as at present used, and shown to more clearly illustrate the invention.

Fig. 4 is a plan view of a section of film, showing strips of tinfoil or other suitable contact, or conducting material cemented to the film near one edge of the smooth side thereof.

Reference is made to the accompanying drawings by similar characters throughout the several views. A denotes in general my improved moving picture operator's automatic signaling device which consists preferably of a frame 1, which consists of a metal plate having one portion bent at right angles to the other and having lugs 19, as shown, at each end thereof. Contact rollers 2 are secured to the frame 1 by spindles 3, on which the contact rollers 2 rotate; the spindles 3 are internally threaded at one end at 4 for the reception of the screws 10, the opposite end of the spindles 3 passing through the nonconducting washers 5, the nonconducting collars 6, the nonconducting washers 7 and through the metallic eyes of the conductors 23 and 24 and being provided with nuts 9, as shown.

The contact rollers 2 are provided with shoulders 11, with which the perforated edges of the film 26 are in contact as it passes through the automatic signaling device, the purpose of which will be later explained. The contact rollers 2 are provided with flanges 12 for the purpose of retaining the film 26 in its proper position on the rollers 2.

A tension roller 13 having shoulders 16 at each end thereof is provided, as shown, the roller 13 being secured to the frame 1 by a spindle 14 which is internally threaded at one end for the reception of a screw 10, and having a head 15 at the opposite end.

Washers 20 through which the screws 10 pass are provided for the rollers 2 and 13.

Guide rollers 17 having shoulders 18 are secured to the frame 1 by the lugs 19, the purpose of the guide rollers being to protect the film 26 against contact with the frame 1.

The shoulders with which the various rollers are provided, as shown and previously described, form the grooves 21, the purpose of which is to prevent the portion of the film 26 containing the pictures coming in contact with the rollers, thus preventing the marring of the pictures as the film 26 passes through the automtaic signaling device. The rollers 2 and 13 are provided with oil holes not shown.

Strips 27, 8 to 10 inches in length of tinfoil or other suitable conducting material are attached to the film 26 near one edge as shown in Fig. 4, one of the strips 27, for the change over signal, being attached near the end, and the other strip 27, for the warning signal, preferably 25 feet from the end of the film 26.

The automatic signaling device is connected with the battery and bell by means of the cords 22, 23 and 24 as shown in Fig. 1. The device is threaded by placing the film 26 back of the contact rollers 2, in front of the tension roller 13 and between the contact roller 2 and the guide rollers 17, as shown.

The operation of the automatic signaling device is as follows: When one of the strips 27 is brought into contact with both of the rollers 2, by the movement of the film 26 through the device, the circuit is completed and the signal given by the ringing of the bell which continues until the circuit is broken by the strip 27 being in contact with only one of the rollers 2.

From the foregoing disclosures it will be manifest that a moving picture operator's automatic signaling device is provided, which will fulfil all of the necessary requirements of such a device.

What I claim as new and desire to secure by Letters Patent is:—

1. A moving picture operator's automatic signaling device including a frame to which contact rollers having shoulders and flanges at each end thereof are attached; spindles by which the contact rollers are attached to the frame and on which the contact rollers rotate, the spindles passing through nonconducting washers placed between the ends of the rollers and frame, through non-conducting collars placed in holes in the frame, through nonconducting washers outside of the frame and through the eyes to which the cords are attached, the spindles being provided with nuts at one end, and washers and screws at the other, as specified and shown.

2. A moving picture operator's automatic signaling device including a frame to which contact rollers, having shoulders and flanges at each end thereof are attached; spindles by which the contact rollers are attached to the frame and on which the contact rollers rotate, the spindles passing through nonconducting washers placed between the ends of the rollers and frame; through nonconducting collars placed in holes in the frame, through nonconducting washers outside and through nonconducting washers outside the frame, and through the eyes to which the cords are attached, the spindles being provided with nuts at one end and washers and screws at the other; a tension roller having a shoulder at each end; a spindle by which the tension roller is attached to the frame, between the contact rollers and on which the tension roller rotates, the spindle having a head at one end and being provided with a washer and screw at the other, as shown and described.

3. A moving picture operator's automatic signaling device including a frame to which contact rollers are attached; spindles by which the contact rollers are attached to the frame and on which the contact rollers rotate; means for insulating the spindles and contact rollers from the frame; means for attaching the eyes to which the cords are secured to the spindles; means for retaining the contact rollers and spindles in their required positions; a tension roller having a shoulder at each end; a spindle by which the tension roller is attached to the frame, and on which the tension roller rotates and means for retaining the tension roller and spindle in their required positions; a pair of guide rollers having shoulders and pivots at each end thereof, one of which is attached at each end of the frame by means of lugs, the various rollers being in parallel spaced relation with each other as specified and shown.

4. A moving picture operator's automatic signaling device including a frame to which contact rollers are attached; spindles by which the contact rollers are attached to the frame and on which the rollers rotate, the contact rollers being provided with shoulders and flanges at each end, the spindles and rollers being insulated from the frame by nonconducting washers and collars; means for securing the eyes to which the cords are attached to the spindles; means for retaining the contact rollers and spindles in their required positions; a tension roller having a shoulder at each end; a spindle by which the tension roller is attached to the frame and on which the tension roller rotates, and means for retaining the tension roller and spindle in their required positions; a pair of guide rollers having shoulders and pivots at each end, one of which is attached at each end of the frame by means of lugs; grooves in the various rollers formed by the shoulders thereon; the several rollers in parallel spaced relation with each other; a film to which strips of tinfoil, or other suitable conducting material, are attached, near an edge of the film, one of the strips of tinfoil being attached at the end and the other at a distance from the end of the film; a battery and bell, and means for connecting the device with the battery and bell, and means for connecting the battery and bell, substantially as shown and described and for the purpose specified.

In testimony that I claim the foregoing as my own, I have hereto affixed my signature in the presence of two witnesses.

OSCAR B. DAY.

Witnesses:
 ALEXIS R. DONNOHUE,
 GLADYS ROGERS.